US012804132B2

(12) United States Patent
Andrivon et al.

(10) Patent No.: US 12,804,132 B2
(45) Date of Patent: Nov. 17, 2026

(54) METHOD AND APPARATUS FOR DIMD INTRA PREDICTION MODE SELECTION IN A TEMPLATE AREA, AND ENCODER/DECODER INCLUDING THE SAME

(71) Applicant: Beijing Xiaomi Mobile Software Co., Ltd., Beijing (CN)

(72) Inventors: Pierre Andrivon, Beijing (CN); Fabrice Leléannec, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/853,662

(22) PCT Filed: Mar. 2, 2023

(86) PCT No.: PCT/CN2023/079418
§ 371 (c)(1),
(2) Date: Oct. 2, 2024

(87) PCT Pub. No.: WO2023/193552
PCT Pub. Date: Oct. 12, 2023

(65) Prior Publication Data

US 2025/0233979 A1 Jul. 17, 2025

(30) Foreign Application Priority Data

Apr. 7, 2022 (EP) .................................... 22167220

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/172* (2014.11); *H04N 19/593* (2014.11)

(58) Field of Classification Search
CPC .. H04N 19/105; H04N 19/159; H04N 19/172; H04N 19/593; H04N 19/11; H04N 19/44; H04N 19/70
See application file for complete search history.

(56) References Cited

U.S. PATENT DOCUMENTS 11,388,421 B1 * 7/2022 Wang ..................... H04N 19/11
2017/0353719 A1 12/2017 Liu et al.
(Continued)

FOREIGN PATENT DOCUMENTS

EP 3962080 A1 3/2022
WO WO 2018054269 A1 3/2018
WO WO-2023044917 A1 * 3/2023 ........... H04N 19/593

OTHER PUBLICATIONS

European Search Report for EP application 22167220.7, dated Sep. 15, 2024.
(Continued)

*Primary Examiner* — Richard A Hansell, Jr.
(74) *Attorney, Agent, or Firm* — Finnegan, Henderson, Farabow, Garrett & Dunner, L.L.P.

(57) ABSTRACT

A method of deriving a Decoder-side Intra Mode Derivation (DIMD) predictor for respective samples of a coding unit (CU) of a picture, includes: splitting a template area adjacent to the CU into a plurality of template area regions; separately selecting no, one or more Intra Prediction Modes (IPMs) in each template area region, wherein the selection involves a selection out of the separately determined IPMs for the entire CU or for one or more regions of the CU; determining blending weights using the selected IPMs, and generating
(Continued)

the DIMD predictor by blending at least the selected IPMs using the determined blending weights.

18 Claims, 13 Drawing Sheets

(51) Int. Cl.
*H04N 19/172* (2014.01)
*H04N 19/593* (2014.01)

(56) References Cited

U.S. PATENT DOCUMENTS

| | | | | |
|---|---|---|---|---|
| 2017/0353730 | A1* | 12/2017 | Liu | H04N 19/159 |
| 2019/0373252 | A1* | 12/2019 | Moon | H04N 19/103 |
| 2021/0021847 | A1* | 1/2021 | Moon | H04N 19/46 |
| 2022/0021874 | A1* | 1/2022 | Fang | H04N 19/176 |
| 2022/0394269 | A1* | 12/2022 | Cao | H04N 19/105 |
| 2023/0108480 | A1* | 4/2023 | Li | H04N 19/176<br>375/240.02 |
| 2024/0236309 | A1* | 7/2024 | Wang | H04N 19/11 |
| 2025/0047867 | A1* | 2/2025 | Naser | H04N 19/593 |
| 2025/0055981 | A1* | 2/2025 | Naser | H04N 19/11 |
| 2025/0310519 | A1* | 10/2025 | Chiang | H04N 19/196 |
| 2025/0343904 | A1* | 11/2025 | Ma | H04N 19/159 |

OTHER PUBLICATIONS

International Search Report and Written Opinion for PCT application No. PCT/CN2023/079418, dated Apr. 20, 2023.

* cited by examiner (a)

(b)

METHOD AND APPARATUS FOR DIMD INTRA PREDICTION MODE SELECTION IN A TEMPLATE AREA, AND ENCODER/DECODER INCLUDING THE SAME

CROSS-REFERENCE TO RELATED APPLICATIONS

This application is the U.S. National Stage Application of International Application No. PCT/CN2023/079418, filed on Mar. 2, 2023, which is based on and claims priority to the European Patent Application No. "22167220.7", filed on Apr. 7, 2022, the entire content of which is incorporated herein by reference.

TECHNICAL FIELD

The present invention generally relates to the field of encoding/decoding pictures, images or videos, and embodiments of the present invention concern improvements regarding the Intra prediction, more specifically, improvements regarding a decoder-side intra mode derivation, DIMD, process. More specific embodiments of the present invention relate to a DIMD intra prediction mode selection in a template area.

BACKGROUND

The encoding and decoding of a picture, an image or a video is performed in accordance with a certain standard, for example, in accordance with the advanced video coding, AVC standard (see "H.264: Advanced video coding for generic audiovisual services, https://www.itu.int/rec/T-REC-H.264-202108-P/en"), the high efficiency video coding, HEVC, standard (see "H.265: High efficiency video coding, https://www.itu.int/rec/T-REC-H.265-202108-P/en") or the versatile video coding, VVC, standard (see "H.266: Versatile video coding, https://www.itu.int/rec/T-REC-H.266-202008-I/en").

An intra prediction mode to be employed for decoding may be carried in a bit stream provided by the encoder and received by the decoder, the intra prediction mode may also be derived by using a gradient analysis of reconstructed pixels neighboring a currently processed coding unit, CU. In other words, the intra prediction mode is not explicitly indicated in the bit stream but is implicit. This approach is referred to as decoder-side intra mode derivation, DIMD, which may be signaled using a simple flag, and the actual intra mode is then derived during a reconstruction process. The encoder may encode into the bit stream information whether DIMD is used or not for the current CU, and in case DIMD is not used, the actual intra mode is signaled by the encoder and parsed from the bit stream by the decoder. There is a need to provide further improvements for the DIMD process.

SUMMARY

The present invention provides a method of deriving a Decoder-side Intra Mode Derivation, DIMD, predictor for respective samples of a coding unit, CU, of a picture, the method comprising:

splitting a template area adjacent to the CU into a plurality of template area regions, separately selecting zero, one or more Intra Prediction Modes, IPMs, in each template area region, wherein the selection involves a selection out of the separately determined IPMs for the entire CU or for one or more regions of the CU, determining blending weights using the selected IPMs, and generating the DIMD predictor by blending at least the selected IPMs using the determined blending weights.

The present invention provides a non-transitory computer-readable storage medium comprising instructions which, when executed by a computer, cause the computer to carry out the inventive method.

The present invention provides an apparatus for deriving a Decoder-side Intra Mode Derivation, DIMD, predictor for respective samples a coding unit, CU, of a picture, the apparatus comprising: a processor and a memory having executable instructions stored thereon. When the processor executes the executable instructions, the processor is configured to implement the inventive method.

It is to be understood that the content described in this section is not intended to identify key or critical features of the embodiment of the present invention, nor is it intended to limit the scope of the present invention. Other features of the present invention become readily apparent from the following description.

BRIEF DESCRIPTION OF THE DRAWINGS

The drawings are explanatory and serve to explain the present invention and are not to be construed to limit the present invention to the illustrated embodiments.

DETAILED DESCRIPTION

Illustrative embodiments of the present invention are described below with reference to the drawings, where various details of the embodiments of the present invention are included to facilitate understanding and are to be considered as illustrative only. Accordingly, those of ordinary skill in the art recognize that various changes and modifications of the embodiments described herein may be made without departing from the scope of the present invention. Also, descriptions of well-known functions and constructions are omitted from the following description for clarity and conciseness.

In the present invention, the term "and/or" is intended to cover all possible combinations and sub-combinations of the listed elements, including any one of the listed elements alone, any sub-combination, or all of the elements, and without necessarily excluding additional elements.

In the present invention, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present invention, the term "coding" refers to "encoding" or to "decoding" as becomes apparent from the context of the described embodiments. Likewise, the term "coder" refers to "an encoder" or to "a decoder".

The encoding and decoding of a picture, an image or a video is performed in accordance with a certain standard, for example, in accordance with the advanced video coding, AVC standard, the high efficiency video coding, HEVC, standard or the versatile video coding, VVC, standard.

Figure 1:
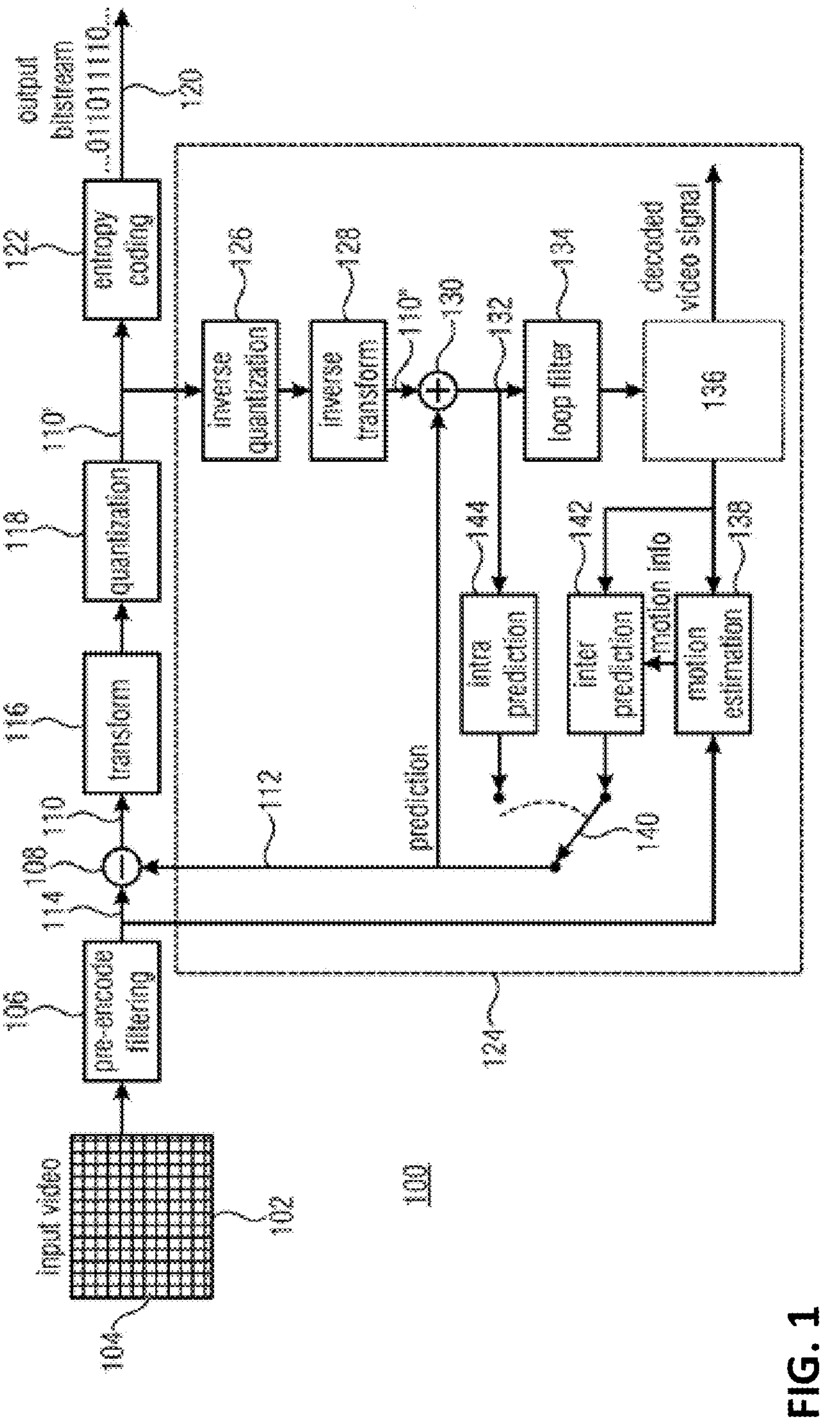
FIG. 1 is a block diagram of a conventional video encoder.

A block diagram of a standard video compression system 100 operating in accordance with the VVC standard is illustrated in FIG. 1. The standard video coder 100 compresses and encodes a picture 102 of a video sequence. The picture 102 to be encoded is partitioned into blocks 104 also referred to as coding units, CUs. The encoder 100 comprises a pre-encode filter 106 and a prediction residual signal former 108 which generates a prediction residual signal 110 so as to measure a deviation of a prediction signal 112 from the signal 114 output by the filter 106. The encoder further comprises a transformer 116, a quantizer 118 and provides an output bitstream or data stream 120 using an entropy coder 122. Further, the encoder 100 comprises a prediction stage 124 for determining the prediction signal 112, which includes a de-quantizer or inverse quantizer 126, an inverse transformer 128, a combiner 130, an in-loop filter 134, a motion estimator 138, an intra/inter mode selector 140, an inter predictor 142 and an intra predictor 144.

The video coder 100 as described with reference to FIG. 1 compresses and encodes a picture 102 of a video sequence as follows. The picture 102 to be encoded is partitioned into the blocks or CUs 104. Each coding unit 104 is encoded using either an intra or inter coding mode. When a CU is encoded in the intra mode, intra prediction is performed by the intra predictor 144. The intra prediction comprises predicting the current CU 114 being encoded by means of already coded, decoded and reconstructed picture samples located around the current CU, e.g., on the top and on the left of the current CU. The intra prediction is performed in the spatial domain. In an inter mode, motion compensation and motion estimation are performed by the motion estimator 138 which searches, in one or more reference pictures provided by the picture buffer 136 and used to predictively code the current picture, a CU that is a good predictor of a current CU. For example, a good predictor of a current CU is a predictor which is similar to the current CU, i.e., the distortion between the two CUs is low or below a certain threshold. The motion estimation may also account for the rate cost of signaling the predictor to optimize a rate-distortion tradeoff. The output of the motion estimation step is one or more motion vectors and reference indices associated with the current CU. The motion compensation then predicts the current CU by means of the one or more motion vectors and reference pictures indices as determined by the motion estimator 138. Basically, the block or CU contained in the selected reference picture and pointed to by the determined motion vector is used as the prediction block for the current CU. The encoder 100, by means of the selector 140, selects one of the intra coding mode or the inter coding mode to use for encoding the CU and indicates the intra/inter decision, for example, by means of a prediction mode flag. Prediction residuals 110 are then transformed and quantized by blocks 116 and 118, and the quantized transform coefficients as well as the motion vectors and other syntax elements are entropy encoded and written into the output bitstream 120. The encoder 100 may skip the transform stage 116 and apply the quantization directly to the non-transformed residual signal 110 in a so-called transform-skip coding mode. After a block or CU has been encoded, the encoder decodes the CU and reconstructs it so as to obtain the reconstructed signal 132 that may serve as a reference data for predicting future CUs or blocks to encode. The quantized transform coefficients 110' are de-quantized and inverse transformed leading to a decoded prediction CU or block 110", and the decoded prediction residuals and the predicted block are then combined at 130, typically summed, so as to provide the reconstructed block or CU 132. The in-loop filters 134 are applied to the reconstructed picture to reduce compensation artifacts. For example, a deblocking filter, a sample adaptive offset, SAO, filter, and an adaptive loop filter, ALF, may be applied to reduce encoding artifacts. The filtered picture is stored in the buffer 136, also referred to as the decoded picture buffer, DPB, so that it may be used as a reference picture for coding subsequent pictures.

Figure 2:
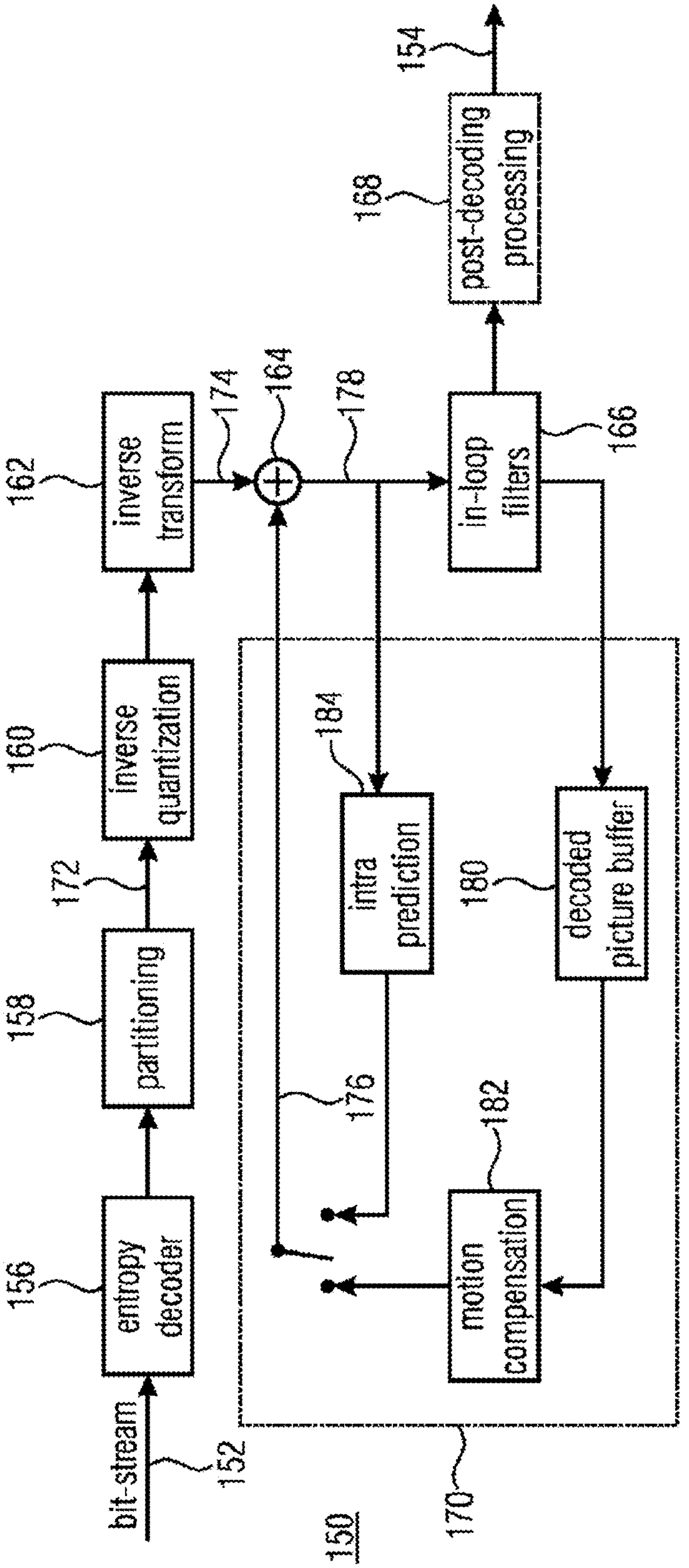
FIG. 2 is a block diagram of a conventional video decoder.

FIG. 2 is a block diagram of a video decoder 150 for predictively decoding from a data stream 152 a picture or video which is provided at an output 154 of the decoder 150. The decoder 150 includes an entropy decoder 156, a partitioning block 158, an inverse quantizer 160, an inverse transformer 162, a combiner 164, an in-loop filter 166, optionally a post-decoding processor 168, and a prediction module 170. The prediction module 170 includes a decoded picture buffer 180 a motion compensator 182 an intra predictor 184.

An encoded picture of a video sequence is decompressed and decoded by the decoder 150 as follows. The input bit stream 152 is entropy decoded by the decoder 156 which provides, for example, the block partitioning information, the coding mode for each coding unit, the transform coefficients contained in each transform block, prediction information, like intra prediction mode, motion vectors, reference picture indices, and other coding information. The block partitioning information indicates how the picture is partitioned and the decoder 150 may divide the input picture into coding tree units, CTUs, typically of a size of 64×64 or 128×128 pixels and divide each CTU into rectangular or square coding units, CUs, according to the decoded partitioning information. The entropy decoded quantized coefficients 172 are de-quantized 160 and inverse transformed 162 so as to obtain the decoded residual picture or CU 174. The decoded prediction parameters are used to predict the current block or CU, i.e., whether the predicted block is to be obtained through its intra prediction or through its motion-compensated temporal prediction. The prediction process performed at the decoder side is the same as the one performed at the encoder side. The decoded residual blocks 174 are added to the predicted block 176, thereby yielding the reconstructed current image block 164. The in-loop filters 166 are applied to the reconstructed picture or image which is also stored in the decoded picture buffer 180 to serve with the reference picture for future pictures to decode. As mentioned above, the decoded picture may further go through a post-decoding processing, for example for performing an inverse color transformation, for example a conversion from YCbCr 4:2:0 to RGB 4:4:4.

As mentioned above, the intra prediction mode to be employed for decoding may be carried in the bit stream provided by the encoder and received by the decoder, however, in accordance with other approaches, rather than introducing the actual intra prediction mode into the bit stream, the intra prediction mode may also be derived by using a gradient analysis of reconstructed pixels neighboring a currently processed CU. In other words, the intra prediction mode is not explicitly indicated in the bit stream but is implicit. This approach is referred to as decoder-side intra mode derivation, DIMD, which may be signaled using a simple flag, and the actual intra mode is then derived during the reconstruction process, like the reconstruction process performed by the prediction block 124/170 of the encoder 100 or the decoder 150. The encoder 100 may encode into the bit stream 120 information whether DIMD is used or not for the current CU, and in case DIMD is not used, the actual intra mode is signaled by the encoder and parsed from the bit stream by the decoder.

Figure 3:
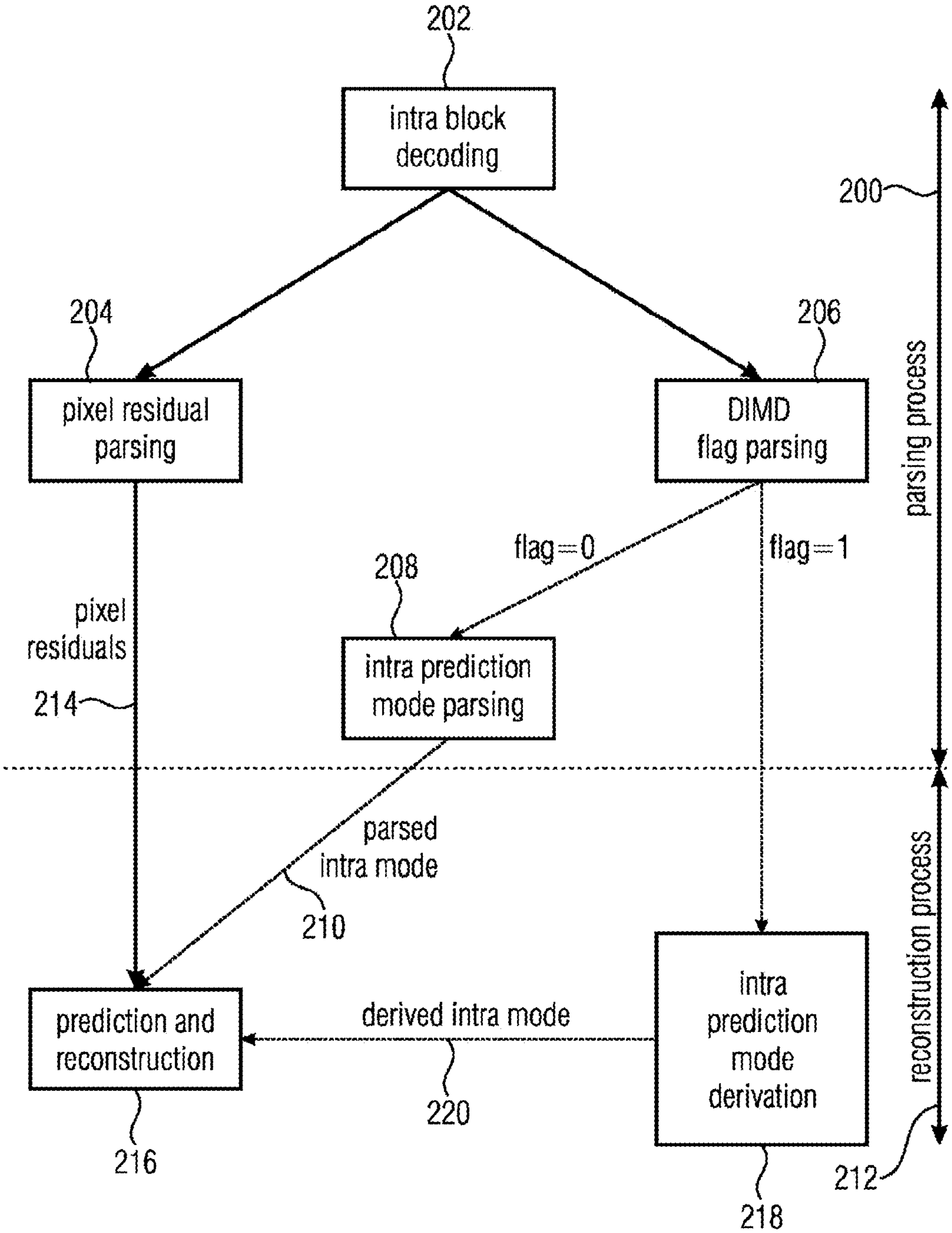
FIG. 3 illustrates an example of an intra block general reconstruction process as it may be applied at the encoder of FIG. 1 or at the decoder of FIG. 2.

FIG. 3, which is taken from "E. Mora et al, "CE3-related: Decoder-side Intra Mode Derivation", JVET-L0164, Macao, October 2018", illustrates an example of an intra block general reconstruction process as it may be applied at the encoder 100 or at the decoder 150. During a parsing process 200, an intra block decoding is determined, as indicated at block 202, and a pixel residual parsing 204 as well as a DIMD flag parsing 206 is performed. In case the DMID flag 206 is zero, an intra prediction mode parsing 208 is performed so as to obtain the intra mode 210 to be used during the reconstruction process 212 when predicting and reconstructing a pixel, as is indicated at 216. In case the DIMD flag 206 is set to one, the intra prediction derivation 218 is performed during the reconstruction process 212 which yields the derived intra mode 220 which is used, together with the pixel residuals 214 at 216, for the reconstruction process.

Figure 4:
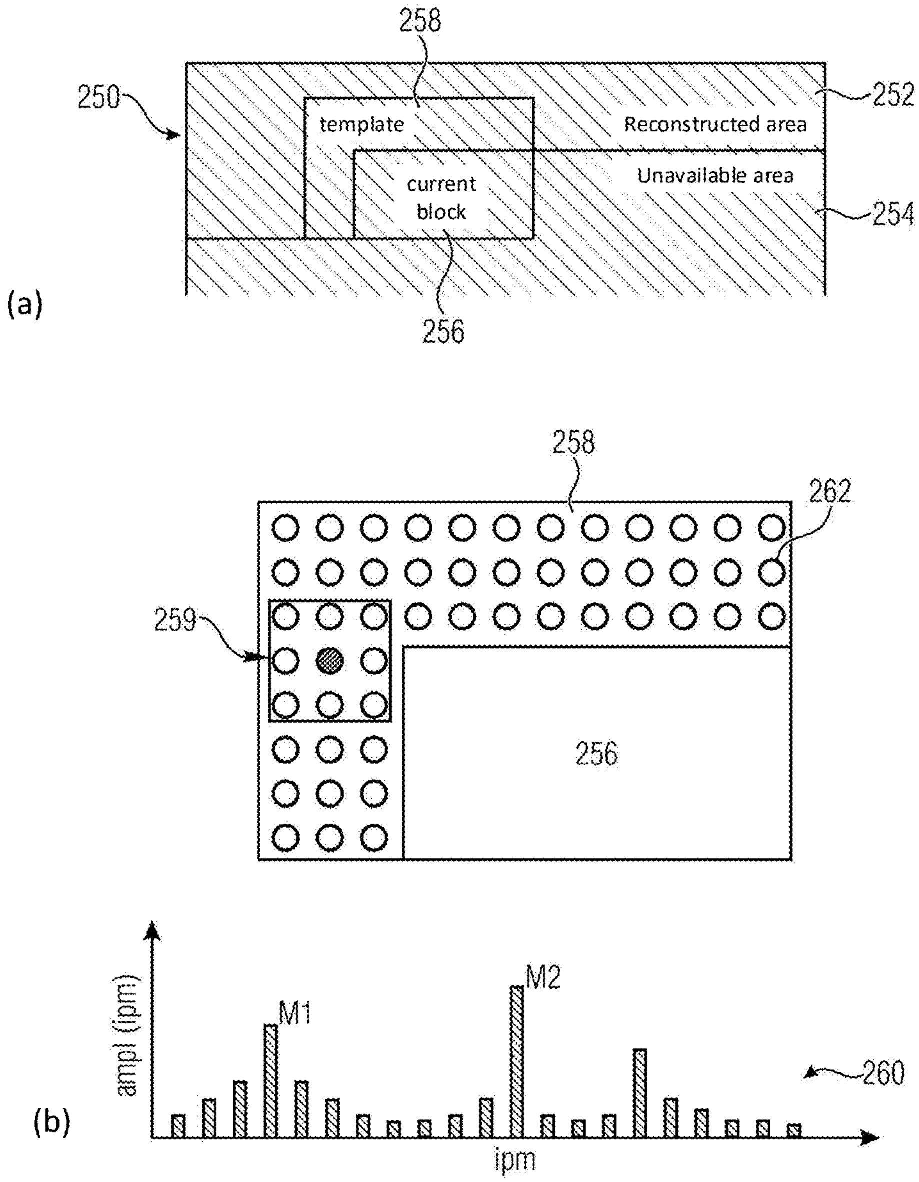
FIG. 4 illustrates a DIMD template area or zone used for computing a Histogram of Gradients, HoG, in the DIMD process.

Further details of the DIMD approach in the documents, such as "E. Mora et al, "CE3-related: Decoder-side Intra Mode Derivation", JVET-L0164, Macao, October 2018", "CE3: Decoder-side Intra Mode Derivation (tests 3.1.1, 3.1.2, 3.1.3 and 3.1.4), JVET-M0094, Marrakech, January 2019", "M. Abdoli et al, E. Mora, T. Guionnet, M. Raulet, Non-CE3: Decoder-side Intra Mode Derivation with Prediction Fusion, JVET-N0342, Geneva, March 2019", and "M. Abdoli et al, "Non-CE3: Decoder-side Intra Mode Derivation with Prediction Fusion Using Planar", JVET-00449, Gothenburg, July 2019". Conventionally, the DIMD process is based on a reconstructed template area adjacent to a currently processed CU which is three samples wide in width and height. The template area comprises a left area, an above area and an above-left area. These areas are also referred to in the following as a left template area region, an above template area region and an above-left template area region. In the template area respective edge detection filters, like 3×3 horizontal and vertical Sobel filters, are applied in order to determine the amplitude and angle of luminance directions or orientations for each middle line sample of the template area. A Histogram of Gradients, HoG, is computed, and each entry corresponds to a conventional intra angular mode and the cumulated intensities are stored:

$$\text{angle} = \arctan(G_{hor}/G_{ver})$$

$$\text{amplitude} = |G_{hor}| + |G_{ver}|$$

with $G_{hor}$ and $G_{ver}$ being the intensity of pure horizontal and vertical directions as calculated by the Sobel filters. FIG. 4, which is taken from M. Abdoli et al, "Non-CE3: Decoder-side Intra Mode Derivation with Prediction Fusion Using Planar", JVET-00449, Gothenburg, July 2019, illustrates the DIMD template area or zone used for computing the HoG. FIG. 4(*a*) illustrates a partially reconstructed picture 250 as indicated by the reconstructed area 252 and the unavailable area 254. In other words, a reconstructed area 252 includes already reconstructed coding units or blocks of the picture to be reconstructed, while the respective coding units or blocks in the unavailable area 254 are still to be reconstructed. A currently processed CU or block 256 is illustrated as well as the above mentioned template area 258. FIG. 4(*b*) illustrates that the template area 258 is 3 samples or pixels wide in width and height, and that a 3×3 horizontal and vertical Sobel filter 259 is used, as described above, to compute the HoG 260 so as to obtain on the basis of the amplitude and angle of luminance directions for each middle line sample 262 of the template area 258 an intra angular prediction mode, also referred to as intra prediction mode, IPM, and for each IPM in the template area an associated cumulated intensity or amplitude. The two most represented IPMs, indicated as $M_1$ and $M_2$ in FIG. 4(*b*), are selected from the HoG 260 and are combined with a Planar mode using weights for $M_1$ and $M_2$ derived from a ratio of their cumulated amplitudes, and a fixed weight for the Planar mode, for example 1/3, i.e., 21/64 with a 6 bit integer precision.

Figure 5:
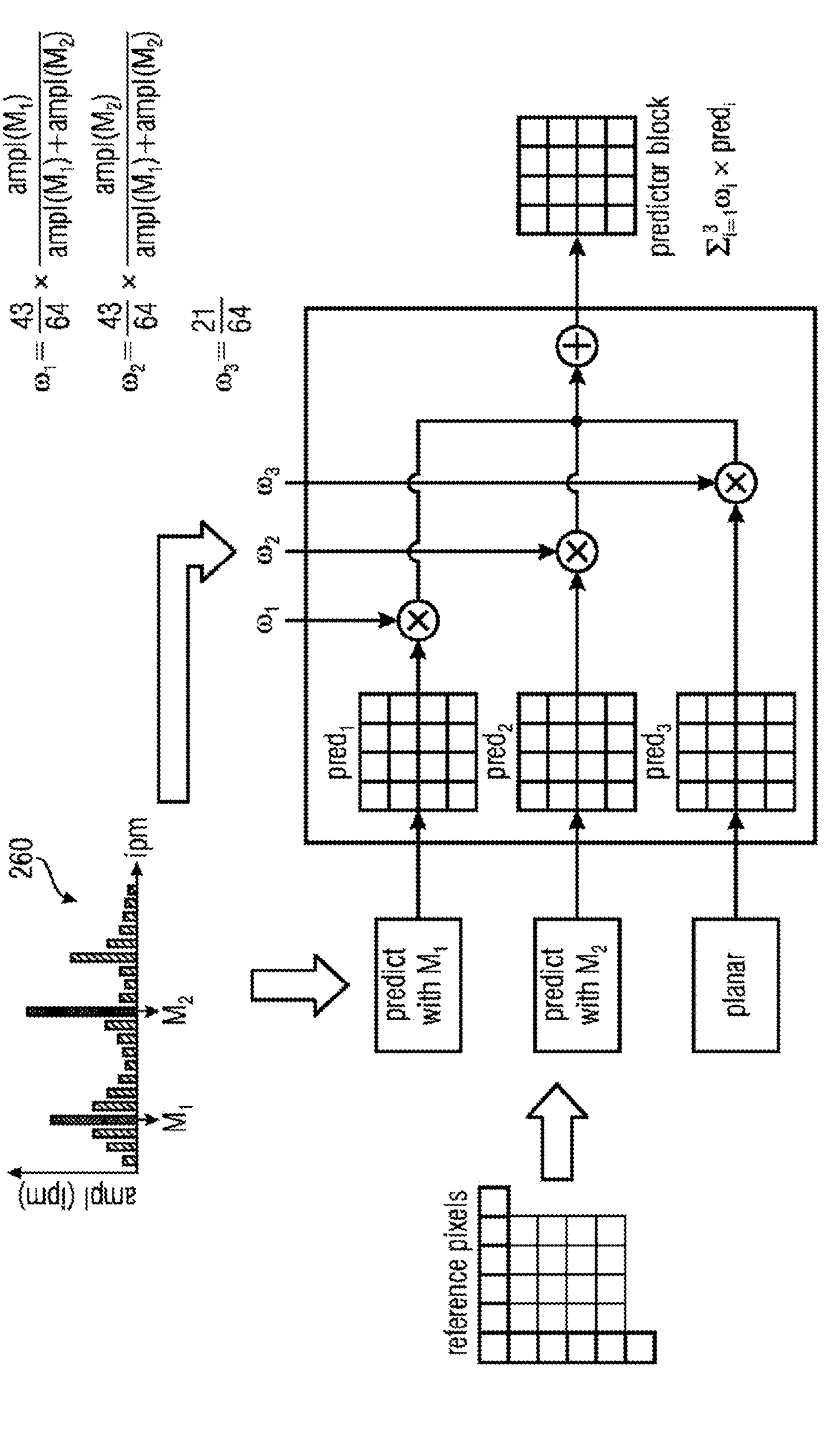
FIG. 5 illustrates the prediction fusion by weighted averaging of selected IPMs and a Planar mode.

FIG. 5, which is taken from "M. Abdoli et al, "Non-CE3: Decoder-side Intra Mode Derivation with Prediction Fusion Using Planar", JVET-00449, Gothenburg, July 2019", illustrates the prediction fusion by weighted averaging of $M_1$, $M_2$ and a Planar mode. Assuming a square shaped CU 256, the respective pixels of the CU 256 are predicted by the two most represented IPMs $M_1$, $M_2$ taken from the HoG 260, thereby obtaining the predictor blocks $Pred_1$, $Pred_2$ and $Pred_3$. The respective predictor blocks are weighted by weights $w_1$, $w_2$, $w_3$, and are fused or combined into the final predictor block including the DMID predictor for the respective samples or pixels in the CU 256.

Figure 6:
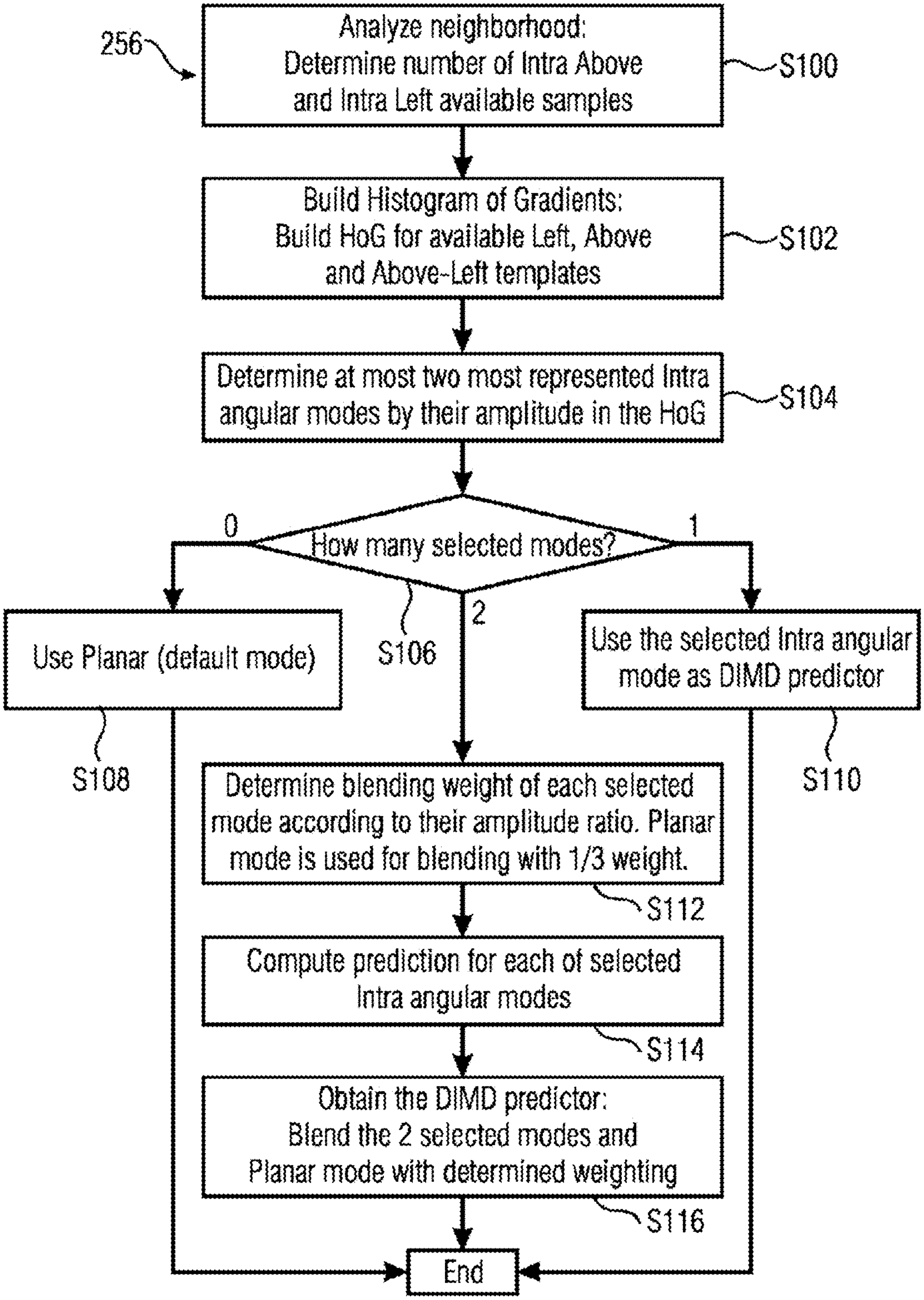
FIG. 6 illustrates an example of a conventional DIMD predictor derivation process.

FIG. 6 illustrates an example of a conventional DIMD predictor derivation process. At S100, using an input CU 256, the neighborhood of the input CU 256 is analyzed so as to determine a number of available intra above and intra left samples. At S102, the HoG 260 is built for the template area 258, i.e., on the basis of the available intra samples angular prediction modes, IPMs, are determined (step S104) by their cumulated amplitude in the HoG 260 (step S104). At S106 it is determined how many IPMs are selected, i.e., whether no IPM has been selected, whether one IPM has been selected or whether two IPMs have been selected. In case no IPM has been selected, only the Planar mode, which may be the default mode, is applied, as is indicated at S108, so as to obtain the DIMD predictor. In case only one IPM is selected, the selected IPM is used to obtain the DIMD predictor, as is indicated at S110. In case two IPMs are selected, at S112 the blending weight for each selected mode is determined according to their cumulated amplitude ratio, and the weight for the Planar mode is set to 1/3. At S114 the predictor blocks $Pred_1$, to $Pred_3$ for each selected IPM and the Planar mode are calculated and at S116 the DIMD predictor is obtained by blending the two selected IPMs and the Planar mode using the determined bending weights.

Figure 7:
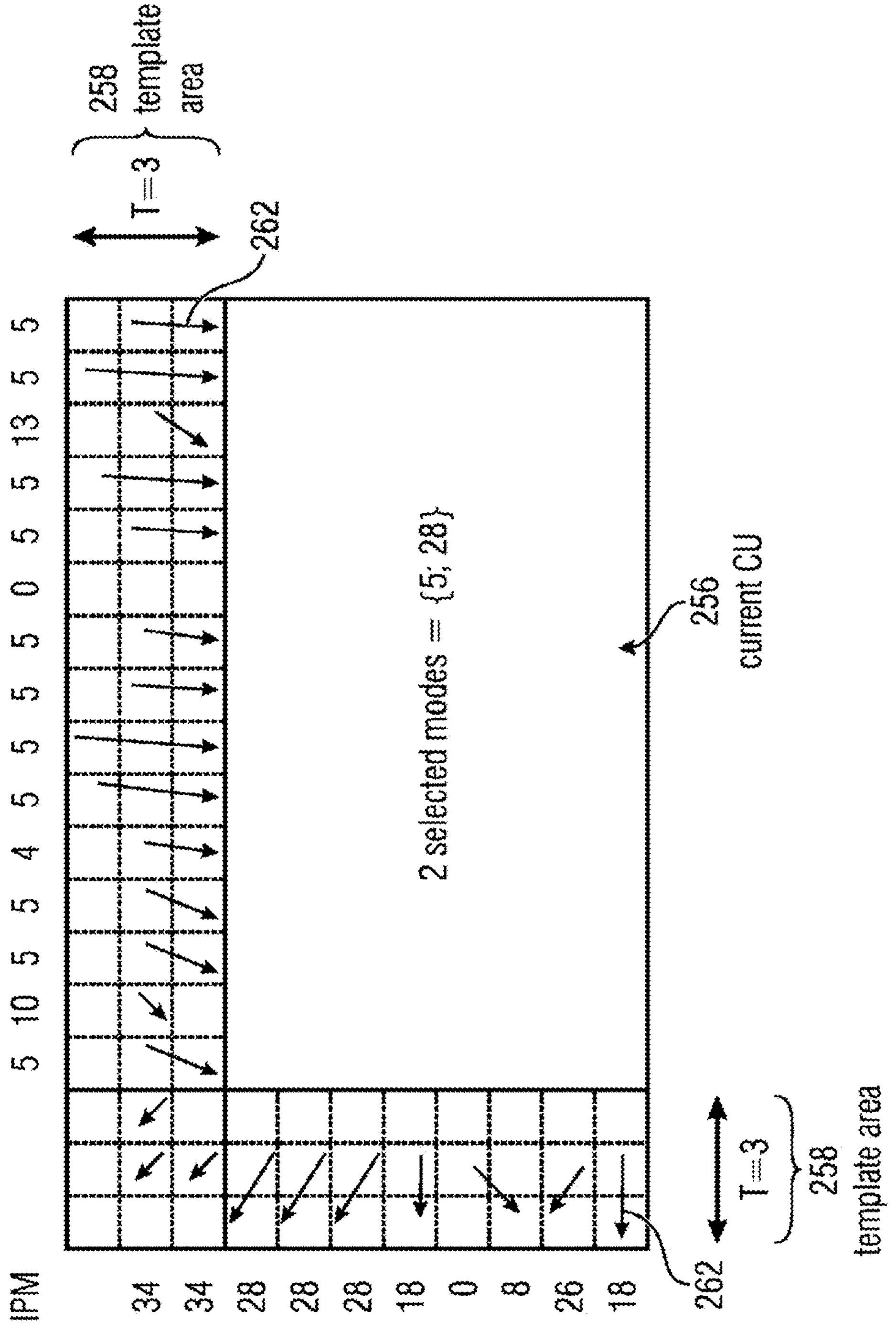
FIG. 7 illustrates an example of a currently processed and an associated template area having a width/height of samples or pixels.

FIG. 7 illustrates an example of a currently processed CU 256 and the associated template area 258 having a width/height of T=3 samples or pixels. For each middle line sample 262 a respective orientation is illustrated by the direction of the respective arrow, and a respective intensity of the gradient is indicated by the length of the arrow. The HoG is generated by cumulating intensities for each orientation/IPM entry, and the two most important modes, in case they exist, in the HoG are selected as modes to be blended with the Planar mode or planar intra prediction mode. In the example of FIG. 7, IPMs 5 and 28 have the first and second highest cumulated intensities/amplitudes. These modes are weighted, as described above, and the blending weights, conventionally, are fixed and/or determined according to the ratio of cumulated intensities/amplitudes of the selected IPMs. Although different blending patterns are proposed in the prior art, all blending patterns are global with regard to the currently processed block or CU. More specifically, when considering conventional approaches and when selecting two IPMs, like $M_1$ and $M_2$, the blending weights may be computed as follows $$w_1 = \frac{43}{64} \times \frac{ampl(M_1)}{ampl(M_1) + ampl(M_2)}$$

$$w_2 = \frac{43}{64} \times \frac{ampl(M_2)}{ampl(M_1) + ampl(M_2)}$$

$$w_3 = \frac{21}{64}$$

with $w_1$ associated with IPM $M_1$, $w_2$ associated with IPM $M_2$, and $w_3$ associated to the Planar mode. Different modifications of the bending process are described in the prior art, for example, "J. Zhao et al, "EE2 Test 2.2: DIMD with multiple blending modes", JVET-W0054, online, July 2021" suggests selecting multiple blending modes based on a rate distortion optimization, "X. Li et al, "EE2-related: Implicit derivation of DIMD blend modes", JVET-W0067, online, July 2021" suggests deriving implicitly two out of three blending modes using the HoG, "J. Zhao et al, "EE2 Related-DIMD with implicitly derived multiple blending modes", JVET-W0126, online, July 2021" suggests implicitly deriving blending modes using template matching, and "S. Yoo et al, "EE2-related: Clean-up on DIMD", JVET-Y0131, online, January 2022" suggests different blending modes according to a number of determined DIMD modes. When DIMD is applied, one or two IPMs are derived from the reconstructed neighboring samples, i.e., from the template area, and in case two intra modes are derived, they are combined, i.e., blended, with the Planar mode predictor, conventional solutions always implement a global or CU-level weighted mixing of the two IPMs with Planar mode.

Conventionally, in the reconstructed part 252 of the picture 250 three columns and lines of reconstructed samples or pixels are used for the DIMD process, i.e., filters having fixed filtering windows of 3×3 samples and being located at the same position in the template area 258 are used to compute the HoG 260. In "CE3: Decoder-side Intra Mode Derivation (tests 3.1.1, 3.1.2, 3.1.3 and 3.1.4), JVET-M0094, Marrakech, January 2019", a 3×3 Sobel filter 259 may be replaced by 3×2 filter when computing a gradient on a pixel located in the left column, top row or top-left sample and directly neighboring the current CU. In "Non-CE3: Decoder-side Intra Mode Derivation with Prediction Fusion Using Planar", instead of using a 3×3 Sobel filter 259 on all pixels or samples in the middle line of the template area 258, the 3×3 Sobel filter 259 may be applied more sparsely, e.g., only at one middle line sample in the left template area and at one middle line sample in the above template area. Further aspects of the DIMD process are described, e.g., in

- "J. Zhao et al, "EE2 Test 2.2: DIMD with multiple blending modes", JVET-W0054, online, July 2021", "X. Li et al, "EE2-related: Implicit derivation of DIMD blend modes", JVET-W0067, online, July 2021", "J. Zhao et al, "EE2 Related-DIMD with implicitly derived multiple blending modes", JVET-W0126, online, July 2021" and "S. Yoo et al, "EE2-related: Clean-up on DIMD", JVET-Y0131, online, January 2022" dealing with the blending of the modes,
- "T. Dumas et al, "AHG12: removing a discontinuity in the discrete angle comparison in DIMD", JVET-X0139, online, October 2021" and "K. Cao et al, "Non-EE2: Fix for histogram of gradients derivation in DIMD mode", JVET-X0156, online, October 2021" dealing with behavior correction (bug fixes) with regards to an original intent,
- "J. Zhao et al, "EE2-Related: Improvements of Decoder-Side Intra Mode Derivation", JVET-V0087, online, April 2021", "X. Li et al, "EE2-related: A combination of CIIP and DIMD/TIMD", JVET-W0068, online, July 2021" and "X. Li et al, "EE2-3.1: Combination of CIIP and DIMD/TIMD", JVET-X0098, online, October 2021" dealing with a combination with other modes,
- "C. Zhou et al, "EE2-related: Optimization on the second mode derivation of DIMD blending mode", JVET-X0115, online, October 2021", "X. Xiu et al, "AHG12: Removal of floating operations in DIMD and TIMD", JVET-X0149, online, October 2021", "K. Naser et al, "AhG12: Removed DIMD from MPM list of TIMD", JVET-Y0097, online, January 2022" or "J. Zhao et al, "Non-EE2: DIMD Flag Signalling Clean-up", JVET-Y0144, online, January 2022" dealing with syntax or simplifications for the DIMD process.

However, the basic DIMD process described above with reference to FIG. 6 and in "M. Abdoli et al, "Non-CE3: Decoder-side Intra Mode Derivation with Prediction Fusion Using Planar", JVET-00449, Gothenburg, July 2019" remained the same.

As described above, the HoG is computed on the basis of the entire template area that is adjacent to the currently processed CU and up to two peaks are selected as angular intra prediction modes to be blended using computed weights depending on the ratio of the cumulated amplitudes in the HoG so as to generate the DIMD predictor for the respective samples in the CU, as has been described above with reference to FIG. 4 and FIG. 5. This may result in a non-optimal DIMD predictor generation.

There is a need to provide further improvements for the DIMD process.

Figure 8:
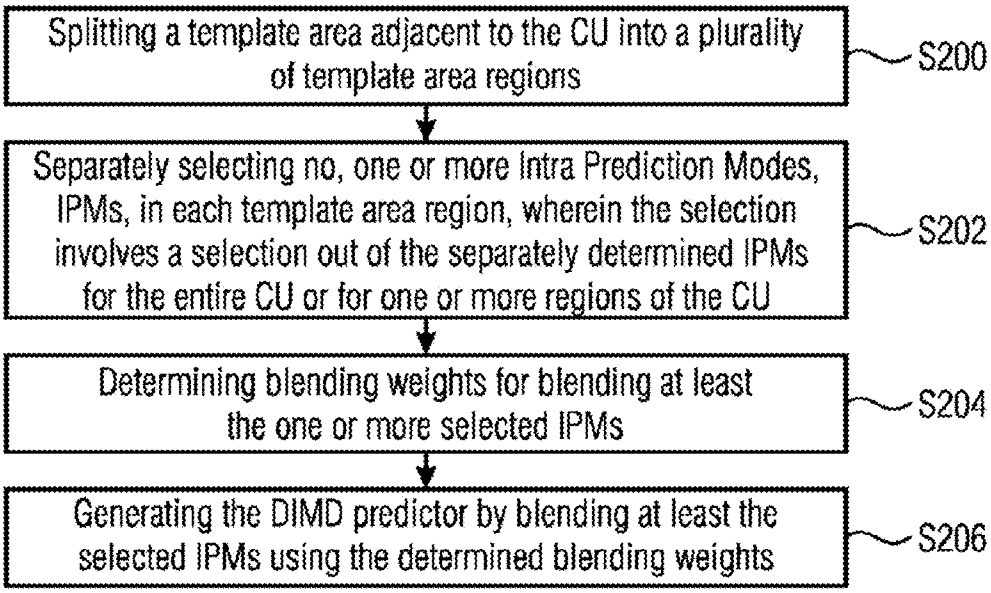
FIG. 8 illustrates a flow diagram of a method in accordance with embodiments of the present invention for deriving decoder-side intra mode derivation predictor for respective samples of a coding unit of a picture.

FIG. 8 illustrates a flow diagram of a method in accordance with embodiments of the present invention for deriving decoder-side intra mode derivation predictor for respective samples of a coding unit of a picture, and the method comprises the following steps:

- S200: splitting a template area adjacent to the CU into a plurality of template area regions.
- S202: separately selecting no Intra Prediction Mode, IPM, i.e., zero IPMs, one IPM or more than one IPM, in each template area region, wherein the selection involves a selection out of the separately determined IPMs for the entire CU or for one or more regions of the CU. For example, 1 or more IPMs may be selected for each template area region, however, also 0, 1, or more than 1 IPMs per each template region may be selected, i.e., IPM per region. In accordance with embodiments, a maximum IPM number may be allocated for the entire template area.
- S204: determining blending weights using the selected IPMs.
- S206: generating the DIMD predictor by blending at least the selected IPMs using the determined blending weights.

In other words, embodiments of the present invention provide a method which splits the template area in regions, computes a HoG per each region, determines and selects IPM(s) from peaks in HoG of these regions, and, eventually, computes the blending weights from a HoGs computed for an area including at least a plurality of the template area regions, e.g., the entire template area. Stated differently, the HoGs per each region are used to select the one or more IPMs on the basis of which the prediction is to be performed, however, for determining the blending weights a more global HoG created over some or all regions, e.g., over the entire template area, is used, more specifically the cumulated amplitudes for the selected IPM included in the global HoG.

It is noted that the present invention is not limited to determining the IPM statistics, on the basis of which the one or more IPMs are selected, on the basis of a HoG. In accordance with other embodiments, other approaches may be applied for determining g the IPM statistics, e.g., a Hough transform or a gradient-based Hough transform may be used on a filtering window size in order to determine directions for each center pixel (of the filtering window) and then a histogram of found directions may allow selecting the peak direction (and the matching IPM).

Figure 9:
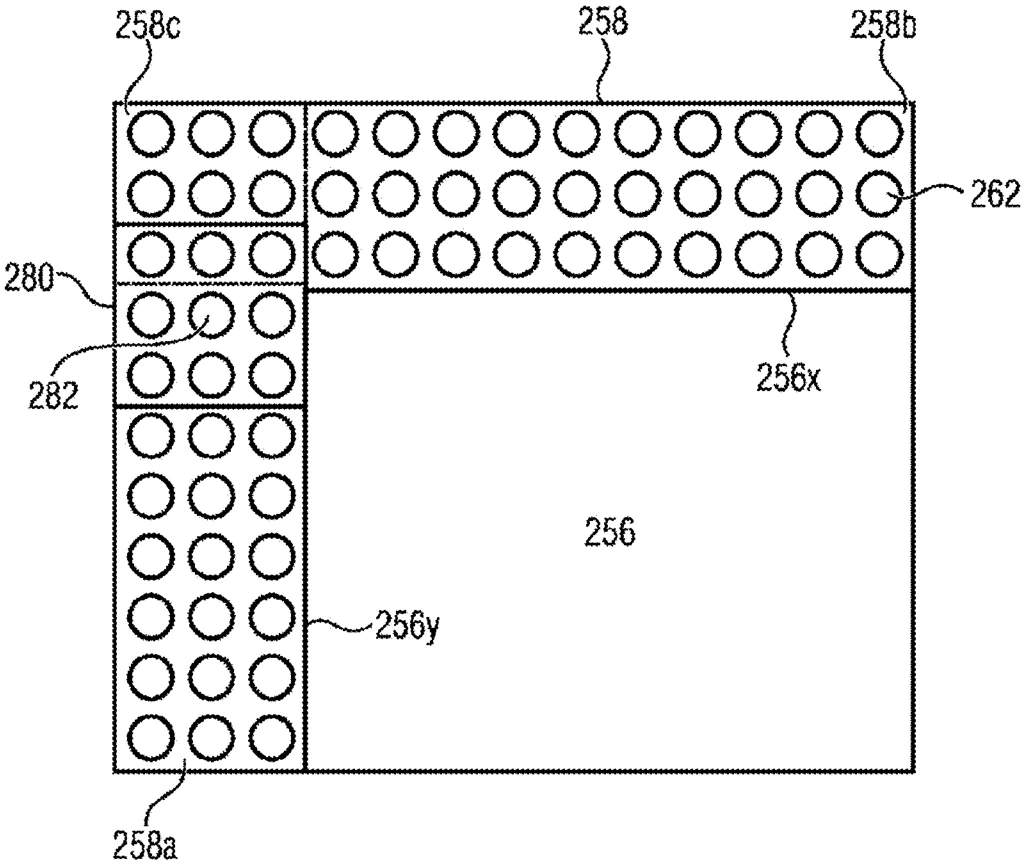
FIG. 9 illustrates the splitting of a template area, which is a reconstructed part of the picture, into three regions.

In accordance with embodiments of the present invention, the IPM selection is carried out in respective template area regions. FIG. 9 illustrates the splitting of a template area, which is a reconstructed part of the picture, into three regions. FIG. 9 illustrates the CU 256 currently processed or predicted, and being adjacent to the template area 258. The template area 258 is split by the boundaries or edges 256*x* and 256*y* of the CU 256 into the left template area or left template area region 258*a*, the above template area or above template area region 258*b* and the above-left template area or above-left template area region 258*c*. The template area 258 comprises respective rows and columns of samples or pixels that may be used for the filtering process and, as described above, the filter may have a fixed 3×3 filtering window, and among the samples in the template area 258 represented by the circles the respective amplitude and angles are determined for each middle line sample 262 which is the center sample for the filtering window 280. FIG. 9 also illustrates the current center sample 282 of the window 280.

In accordance with embodiments of the present invention, constrains on the selection of IPMs per template area region are provided so that a portion of the current CU 256 may be better predicted. An advantage of the embodiments of the present invention is to be seen in the fact that the content characteristics may be adjusted locally as different IPMs better match to different regions of the currently processed or predicted CU 256. Contrary to the inventive approach, conventional approaches select only the two best IPMs from the entire template area, however, a certain template area region may have content characteristics showing slightly different directions or angles so that the number of possible IPMs, for example, 67 IPMs without counting wide angular intra modes, may create wide peaks in the HoG for which the selected modes may match in most of the template area regions but may not suit the best local characteristics of a specific template area region. Thus, other than conventional approaches in accordance with which the HoG is computed on the whole template area and the two highest peaks in the HoG are selected as the two IPMs, in accordance with embodiments of the present invention, an HoG is computed per template area region, i.e., there is one HoG for the above template area region 258*b*, one HoG for the left template area region 258*a* and one HoG for the above-left template area region 258*c*. Further, a predetermined or maximum number of IPMs are allocated for each of the mentioned template area regions, and the IPMs in each template area region are selected as the peak of cumulated amplitudes in the respective template area region HoG.

Figure 10:
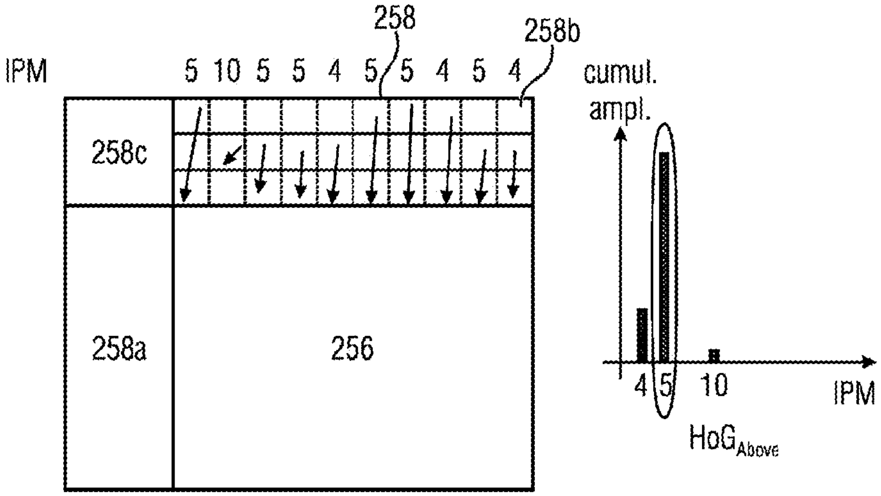
FIG. 10 illustrates the selection of IPMs based on a local HoG computation in accordance with embodiments of the present invention.
Figure 10:
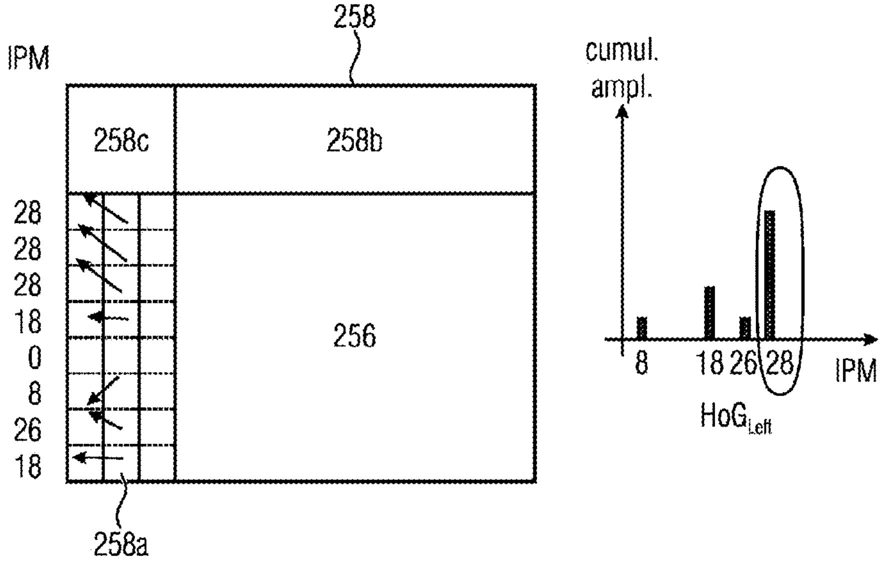

FIG. 10 illustrates the selection of IPMs based on a local HoG computation in accordance with embodiments of the present invention. FIG. 10 assumes that for each template region one IPM is selected, and FIG. 10(*a*) illustrates the selection of one IPM on the basis of the $HoG_{Above}$ generated only for the above template area region. In FIG. 10, as in FIG. 7, the orientation of the IPM is indicated by the respective arrows, and the amplitude is represented by the lengths of the arrows. In the depicted embodiment, the cumulated amplitude of the IPM 5 in the above template region is the highest or above a certain threshold and, therefore, IPM 5 is selected. FIG. 10(*b*) illustrates the selection of one IPM in the left template area region for which a $HoG_{Left}$ is calculated which illustrates the cumulated amplitudes for the respective IPMs determined in the left template area region. As is illustrated, the highest peak is selected, i.e., the IPM having the highest cumulated amplitude which in the depicted embodiment is IPM 28.

It is noted that the present invention is not limited to selecting only one IPM from the respective template area regions, rather, more than one IPMs or no IPM may be selected per template area.

In accordance with embodiments, the number of IPMs per template area region may depend on a size/shape of a currently processed CU 256. For example, if the current CU 256 has a height that is larger than the width, two IPMs may be selected for the left template area region, one IPM may be selected for the above template area region and one IPM may be selected for the above-left template area region. In accordance with other embodiments, one IPM may be selected for the left and the above-left template area regions while no IPM is selected for the above template area region. In accordance with yet other embodiments, one IPM may be selected for the left and above template area regions and no IPM may be selected for the above-left template area region.

For example, when considering the size of the current CU, the total number of IPMs (for the entire template area) is higher for a big CU size (e.g. 16×16 and above) and lower for smaller CU size (e.g. 4×4, 8×8 and less). The total number of IPMs is selected for the entire template area and then those IPMs are spread on each region with a bigger region having the most IPMs and the smaller region having less IPMs. For example, if 4 IPMs can be selected for a 16×16 CU, 2 IPMs may be in the template area region along the longer side, 1 (or 2) IPMs may be in the template area region along the shorter side and 0 (or 1) IPM may be in the above-left template area region.

In accordance with further embodiments, in case two or more angular IPMs may be selected, so that, for example, in case of selecting three IPMs, two IPMs may be selected for the larger template area region, i.e., the template area region having the most samples/pixels already reconstructed, and the remaining IPM may be selected from the second largest template area region. In case two IPMs are to be selected, for example, with a third mode being the Planar or DC mode, the two IPMs may be selected in the largest template area region.

In accordance with yet further embodiments, different IPMs or the same IPMs may be selected for each template area region. For example, the two best IPMs may be selected for the above template area region from the $HoG_{above}$, one best IPM may be selected for the above-left template area from the $HoG_{above\text{-}left}$, and the two best IPMs for the left template area region may be selected from the $HoG_{left}$, yielding a total of five different IPMs of which some or all may be the same IPMs.

In accordance with yet other embodiments, in case the number of IPMs to be selected is greater than two, two IPMs may be selected in the template area region where a maximum cumulated amplitude is present, wherein the maximum cumulated amplitude may be determined from the peak value of a cumulated amplitude provided by a global HoG computed over the entire template area 258. The remaining IPMs may be selected in those one or more template regions where the maximum cumulated amplitude as derivable from the respective local HoGs is the highest. For example, in case of three IPMs to be selected, if the greatest amplitude in the global HoG is present in above template area region, two IPMs having the highest cumulated amplitude are selected in the above template region, and then the highest amplitude from the local HoGs for the above-left and the left template area regions are compared, and the last IPM is selected from that region in which the local HoG indicates the highest cumulated amplitude. This principle may be repeated in case of selecting more IPMs.

In accordance with embodiments, only one IPM may be selected in the template area region having the maximum cumulated amplitude in the global HoG, while the other IPM may be selected in another template region, for example, one IPM may be selected in each template area region, and/or the remaining IPM may be selected from the template area region having the most samples or the template area adjacent to the longer side of the CU 256.

In accordance with yet other embodiments, the selected IPM in the different template area regions may be different. If, however, two selected IPMs are identical in different template regions, a second peak in the local HoG computed on the respective template area region may be selected. In accordance with other embodiments, in case two selected IPMs are identical in different template area regions, the selected IPMs computed on the basis of the local template area region HoG may be discarded and only the IPM associated with the first template area region may be kept.

In accordance with yet other embodiments, a total number of IPMs to be selected may be fixed. For example, if the total number of possible IPMs is two, one IPM may be selected in the above template area region and the other one may be selected in the left template area region, and no IPM may be selected in the above-left template area region.

Figure 11:
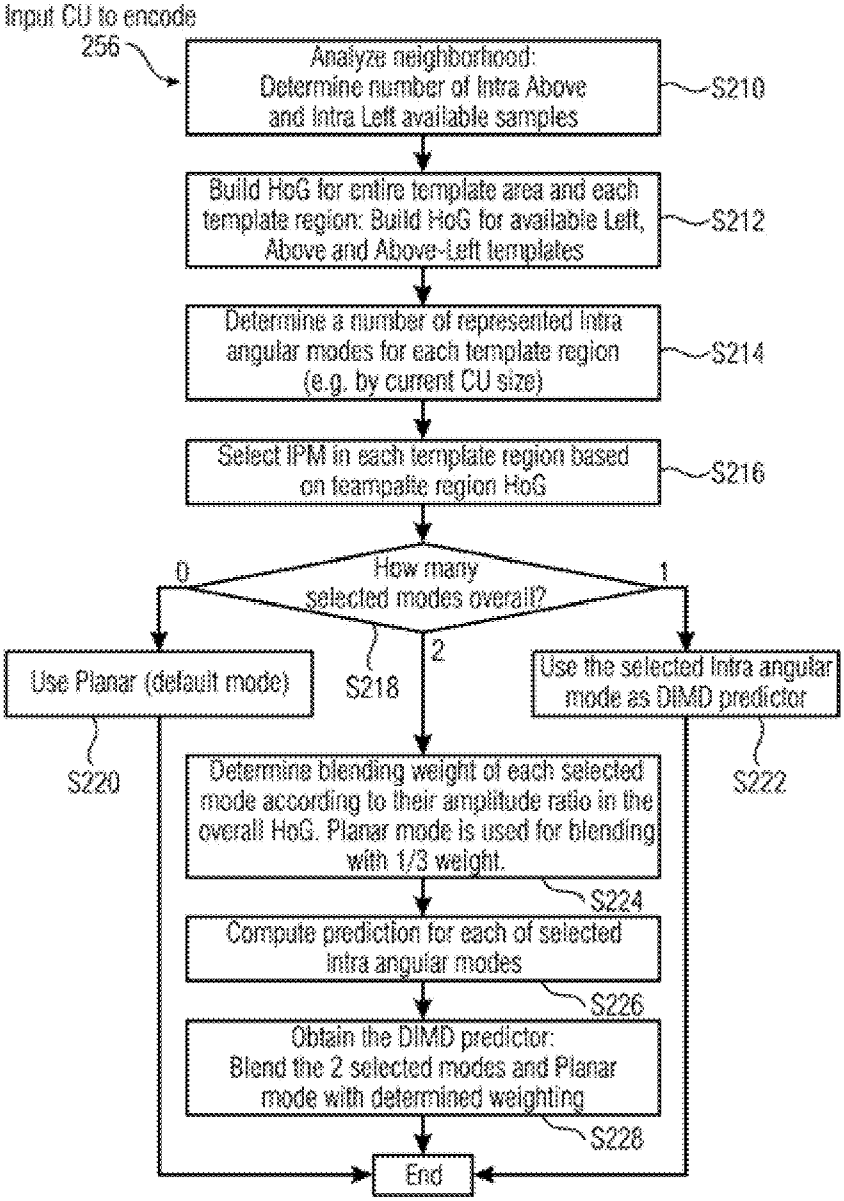
FIG. 11 illustrates a flow diagram for selecting IPMs on the basis of local HoGs in accordance with an embodiment of the present invention.

FIG. 11 illustrates a flow diagram for selecting IPMs on the basis of local HoGs in accordance with an embodiment of the present invention. Initially, at S210, the neighborhood of a currently processed or predicted CU 256 is analyzed so as to determine a number of available intra-above and intra-left samples, i.e., for determining the template area 258. At S212, a global HoG is built for the entire template area 258, and respective local HoGs are built for each template area region, i.e., the HoGs are built for the available left, above, and above-left template area regions. At S214, for each template area region, a number of represented IPMs is determined, wherein the number may depend, for example, on a size of a currently predicted CU 256. An IPM may be considered to be represented within a template region in case an accumulated amplitude of the IPM in the HoG exceeds a certain threshold, like 50, or in case the number of samples in the template area being associated with the same IPM exceeds a predefined value. At S216, for each template region, the one or more IPMs are selected based on the template region HoG. In the embodiment of FIG. 11, it is assumed that at most two IPMs are selected in total, so that it is determined at S218 whether no IPM, one IPM or two IPMs were selected. In case no IPM was selected, the Planar or DC mode is used as the DIMD predictor, as is indicated at S220. In case only one IPM is selected, the selected one IPM is used as the DIMD predictor, as is indicated at S222. On the other hand, in case it is determined that two IPMs are selected, the blending weight of each selected IPM is determined according to the cumulated amplitude ratio obtained from a global or overall HoG, and the Planar mode may be blended with a 1/3 weight, as is indicated at S224. At S226, the prediction for each of the selected IPMs is computed and at S228, the DIMD predictor is obtained by blending the two selected modes and the Planar mode using the determined weights.

In accordance with embodiments, the blending weights may be computed by initially selecting the IPMs using, e.g., the HoG, and then the blending weight for a selected IPM is determined by weighting a first value obtained from one or more predefined characteristics, like the cumulated amplitude or any other suitable characteristic, associated with the one or more selected IPMs on the basis of the number of selected IPMs. Optionally, in addition to the blending weights of the IPMs, also a blending weight of a Planar or DC mode may be determined only on the basis of the number of selected IPMs.

Further, more detailed embodiments for determining or setting the blending weights are now described, without limiting the present invention to these embodiments. As described above, the IPM selection may be performed on a per template area region HoG, however, the actual IPM blending weights to be used are computed on the basis of the accumulated amplitudes obtained from an HoG for the entire template area. The blending weights may be adjusted according to the number of selected different IPMs, so that, for example, in case N angular IPMs are selected and merged (optionally, also with the Planar or DC mode), the weights for each IPM may be computed as follows:

$$w_i = \frac{N}{N+1} \times \frac{ampl(M_i)}{\sum_{j=1}^{N} ampl(M_j)},\ w_{Planar} = \frac{1}{N+1}$$

with $w_i$ being the blending weight of the i-th IPM, $M_i$ being the i-th selected IPM, i belongs to [1, N], ampl(X) being the cumulated amplitude of the IPM X in the global HoG, N being the number of selected angular IPM. $w_{Planar}$ is the blending weight of Planar mode.

In the embodiments described so far, the blending weights are derived using the cumulated amplitudes obtained from a global HoG obtained over the entire template area 258. In accordance with other embodiments, the blending weights may be derived from the ratio of the cumulated amplitudes extracted from a HoG that is computed over those template area regions for which an IPM is selected.

In accordance with yet other embodiments, the Planar mode may be replaced by the DC mode in any of the described embodiments.

In accordance with yet other embodiments, only the IPMs may be used, and the blending weights may be adjusted as follows:

$$w_i = \frac{1}{N} \times \frac{ampl(M_i)}{\sum_{j=1}^{N} ampl(M_j)}$$

In accordance with yet other embodiments, the blending weights may be computed from a ratio of the selected IPM amplitude extracted from a local HoG with the other selected IPM cumulated amplitudes extracted from the global HoG or local HoG (i.e. numerator of above equation rests upon amplitude collected on local HoG and denominator on amplitudes collected on either local or global HoG).

Figure 12:
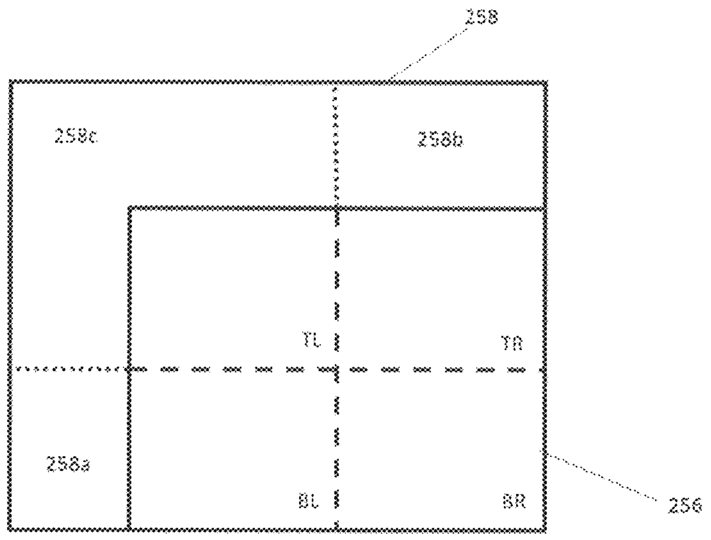
FIG. 12 illustrates an example of a CU being split into four CU regions, the top-left region TL, the top-right region TR, the bottom-left region BL and the bottom-right CU region BR.

In accordance with the above-described embodiments of the present invention, the HoGs are created for the left, above and above-left template area regions. However, the present invention is not limited to dividing the overall template area 258 in such a way. Rather, the template area may be separated in other template area regions. For example, the CU 256 may be split into a plurality of regions along one or more vertical and one or more horizontal lines, and when extending the respective vertical/horizontal lines creating the respective CU regions in the CU 256 into the template area 258, the template area 258 is separated into respective template area regions being adjacent to respective CU regions, and the template area regions may also be referred to as partial template area regions. FIG. 12 illustrates an example of a CU 256 being split into four CU regions, namely the top-left region TL, the top-right region TR, the bottom-left region BL and the bottom-right CU region BR. The lines dividing the CU 256 into the respective regions are extended into the template area 258 thereby yielding the partial template area regions 258*a*, 258*b* and 258*c*. When compared to the initial embodiments, the partial template area region 258*a* is a part of the above-described left template area region, actually the part thereof which is only adjacent to the bottom-left CU region. The partial template area region 258*b* is a part of the above-described above template area region, actually the part thereof being adjacent only to the top-right CU region. The third partial template area region 258 comprises the above-described above-left template area region and those parts of the above and left template area regions being adjacent only to the top-left CU region.

In accordance with further embodiments, the above principles of generating local HoGs may also be applied, so that respective local HoGs are generated for the above-described partial template area regions 258*a*-258*c* for selecting respective IPMs to be used for the DIMD process.

Further Embodiments

So far, the inventive concept has been described with reference to aspects and embodiments concerning methods for determining a DIMD predictor. In accordance with further embodiments, the present invention also provides an apparatus of deriving DIMD predictor as well as encoders/decoders including such an apparatus.

Figure 13:
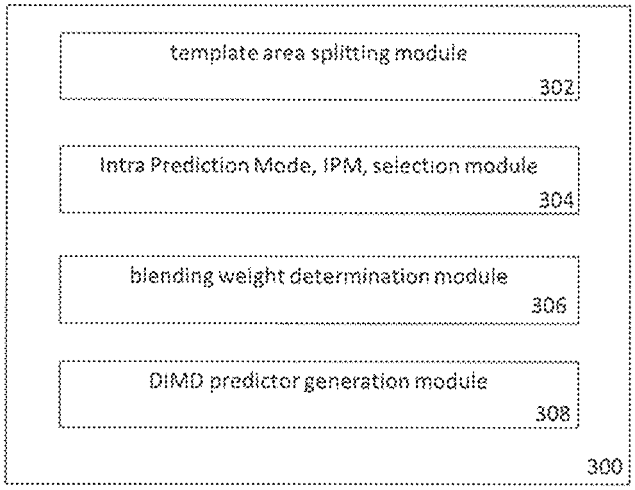
FIG. 13 illustrates a block diagram of an apparatus of deriving DIMD predictor in accordance with embodiments of the present invention.

FIG. 13 illustrates a block diagram of an apparatus for deriving a Decoder-side Intra Mode Derivation, DIMD, predictor for respective samples a coding unit, CU, of a picture. The apparatus 300 includes the following modules:

- 302: A template area splitting module configured to split a template area adjacent to the CU into a plurality of template area regions.
- 304: An Intra Prediction Mode, IPM, selection module configured to select zero, one or more Intra Prediction Modes, IPMs, in each template area region, wherein the selection involves a selection out of the separately determined IPMs.
- 306: A blending weight determination module configured to determine blending weights using the selected IPMs.
- 308: A DIMD predictor generation module configured to generate the DIMD predictor by blending at least the selected IPMs using the determined blending weights.

Figure 14:
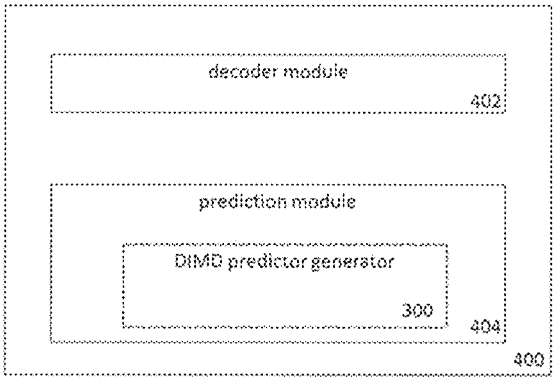
FIG. 14 illustrates a block diagram of a decoder in accordance with embodiments of the present invention.

FIG. 14 illustrates a block diagram of a decoder for decoding an encoded data stream, the encoded data stream including data representing a picture in accordance with embodiments of the present invention. The decoder 400 includes the following modules:

- 402: a decoder module configured to decode from the encoded data stream the picture.
- 404: a prediction module including an apparatus for deriving a Decoder-side Intra Mode Derivation, DIMD, predictor for respective samples of a coding unit, CU, of the picture in accordance with embodiments of the present invention.

Figure 15:
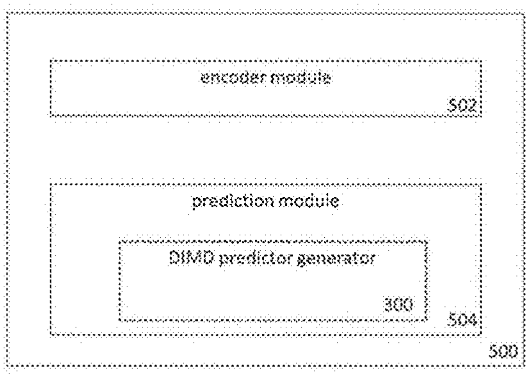
FIG. 15 illustrates a block diagram of an encoder in accordance with embodiments of the present invention.

FIG. 15 illustrates a block diagram of an encoder for encoding a picture into an encoded data stream, the encoded data stream including data representing the picture in accordance with embodiments of the present invention. The encoder 500 includes the following modules:

- 502: an encoder module configured to receive the original picture and to encode the picture into the encoded data stream.
- 504: a prediction module, the prediction module including an apparatus for deriving a Decoder-side Intra Mode Derivation, DIMD, predictor for respective samples of a coding unit, CU, in accordance with embodiments of the present invention.

The present invention provides an apparatus for encoding a picture into an encoded data stream, the encoded data stream including data representing the picture, the apparatus comprising:

- an encoder module configured to receive the original picture and to encode the picture into the data stream, and a prediction module, the prediction module including an inventive apparatus for deriving Decoder-side Intra Mode Derivation, DIMD, predictor for respective samples a coding unit, CU, of the picture.

The present invention provides a method of deriving a Decoder-side Intra Mode Derivation, DIMD, predictor for respective samples of a coding unit, CU, of a picture, the method comprising:

splitting a template area adjacent to the CU into a plurality of template area regions, separately selecting zero, one or more Intra Prediction Modes, IPMs, in each template area region, wherein the selection involves a selection out of the separately determined IPMs for the entire CU or for one or more regions of the CU, determining blending weights using the selected IPMs, and generating the DIMD predictor by blending at least the selected IPMs using the determined blending weights.

Optionally, a number of selected IPMs per template area region depends on the size of the CU, wherein when the CU is of square shape, the same number of IPMs is selected in all template area regions, or the same number of IPMs is selected in all template area regions adjacent to the sides of the CU, with no IPM being selected in the template area region adjacent only to the corner of the CU, or one or more IPMs are selected in the template area region adjacent only to the corner of the CU, with no IPM being selected in all template area regions adjacent to the sides of the CU, or when the CU is of rectangular shape, a first number of IPMs is selected in a template area region adjacent to the longer side of the CU, a second number of IPMs is selected in the template area region adjacent to the shorter side, and a third number of IPMs is selected in an above-left template area region, wherein the first number is higher than the second and third numbers, and the second and third numbers being the same or different, or the same number of IPMs is selected in a template area region adjacent to the shorter side of the CU and for a template area region adjacent to the longer side of the CU, and no IPM is selected in an above-left template area region, or the same number of IPMs is selected in a template area region adjacent to the shorter side of the CU and for an above-left template area region, and no IPM is selected in a template area region adjacent to the longer side of the CU, or the same number of IPMs is selected in a template area region adjacent to the longer side of the CU and for the above-left template area region, and no IPM is selected in a template area region adjacent to the shorter side of the CU.

Optionally, a number of selected IPMs per template area region depends on a size of the CU, and a first number of IPMs is selected in case the CU has a first size, and a second number of IPMs is selected in case the CU has a second size, the second size being higher or larger than the first size.

Optionally, for each template area region a predefined number of IPMs is selected, wherein the predefined number is the same or is different for the respective template area regions.

Optionally, a first number of IPMs is selected in the template area region having a maximum cumulated amplitude among all template area regions, and a second number of IPMs is selected in the other template area regions, wherein the first number is higher than the second number.

Optionally, if two or more selected IPMs are identical in different template area regions, the IPM for the first or last processed template area region is selected and kept, and the other identical IPMs are discarded.

Optionally, a total number of selectable IPMs is fixed.

Optionally, the blending weight for a selected IPM is determined by weighting a first value obtained from one or more predefined characteristics associated with the one or more selected IPMs on the basis of the number of selected IPMs, and, optionally, in addition to the blending weights of the IPMs, further a blending weight of a Planar or DC mode is determined only on the basis of the number of selected IPMs.

Optionally, in case IPMs are selected in all template area regions, the blending weights are derived from one or more predefined characteristics associated with the one or more selected IPMs and obtained from the entire template area, or in case IPMs are selected in one or more but not all the template area regions, the blending weights are derived from one or more predefined characteristics associated with the one or more selected IPMs and obtained from the template area regions from which one or more IPMs are selected, or in case IPMs are selected in only one template area region, the blending weights are derived from one or more predefined characteristics associated with the one or more selected IPMs and obtained from the one template area region.

Optionally, the plurality of template area regions of the template area comprises a left template area region, an above template area region and an above-left template area region, or in case the CU is split into a plurality of CU regions, respective template area regions associated with a CU region adjacent to the template area, and, optionally, an above-left template area region The present invention provides a non-transitory computer-readable storage medium comprising instructions which, when executed by a computer, cause the computer to carry out the inventive method.

The present invention provides an apparatus for deriving a Decoder-side Intra Mode Derivation, DIMD, predictor for respective samples a coding unit, CU, of a picture, the apparatus comprising:

a template area splitting module configured to split a template area adjacent to the CU into a plurality of template area regions, an Intra Prediction Mode, IPM, selection module configured to select zero, one or more Intra Prediction Modes, IPMs, in each template area region, wherein the selection involves a selection out of the separately determined IPMs, a blending weight determination module configured to determine blending weights using the selected IPMs, and a DIMD predictor generation module configured to generate the DIMD predictor by blending at least the selected IPMs using the determined blending weights.

The present invention provides an apparatus for decoding an encoded data stream, the encoded data stream including data representing a picture, the apparatus comprising:

a decoder module configured to decode from the encoded data stream the picture, and a prediction module, the prediction module including an inventive apparatus for deriving a Decoder-side Intra Mode Derivation, DIMD, predictor for respective samples a coding unit, CU, of the picture.

The present invention provides an apparatus for encoding a picture into an encoded data stream, the encoded data stream including data representing the picture, the apparatus comprising:

an encoder module configured to receive the original picture and to encode the picture into the data stream, and a prediction module, the prediction module including an inventive apparatus for deriving Decoder-side Intra Mode Derivation, DIMD, predictor for respective samples a coding unit, CU, of the picture.

The technical solutions provided according to embodiments of the present invention have the following beneficial effects.

As has been described above with reference to conventional approaches, the HoG is computed on the basis of the entire template area. However, it has been found that the conventional approaches are disadvantageous, more specifically the computing of the HoG on the basis of the entire available template area which results in the selection of the one or more IPMs independent of their location in the template area. Due to the fine granularity of angular intra prediction modes, two consecutive modes with the same directions in the same portion of the template area may be selected while other strong directions may be present in other portions of the template area which may be closer, in terms of sample distance/similarity, to a portion of a CU that is currently predicted. This results in a suboptimal DIMD predictor generation.

Although some aspects of the disclosed concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 16:
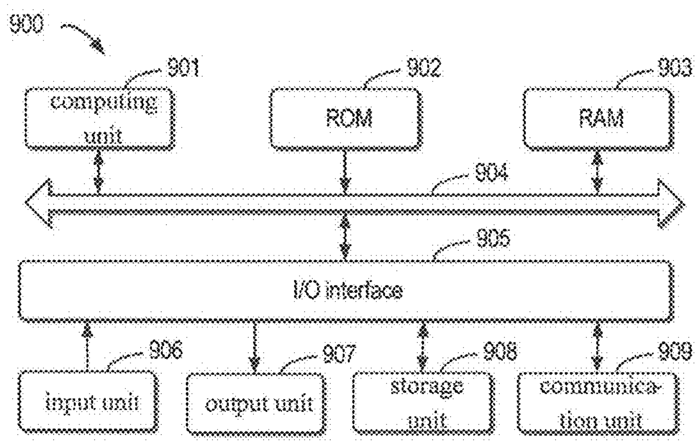
FIG. 16 illustrates a block diagram illustrating an electronic device according to embodiments of the present invention.

FIG. 16 is a block diagram illustrating an electronic device 900 according to embodiments of the present invention. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processor, a cellular phone, a smart phone, a wearable device, and other similar computing devices. The components shown herein, their connections and relationships, and their functions are described as examples only, and are not intended to limit implementations of the present invention described and/or claimed herein. The device 900 includes a computing unit 901 to perform various appropriate actions and processes according to computer program instructions stored in a read only memory (ROM) 902, or loaded from a storage unit 908 into a random access memory (RAM) 903. In the RAM 903, various programs and data for the operation of the storage device 900 can also be stored. The computing unit 901, the ROM 902, and the RAM 903 are connected to each other through a bus 904. An input/output (I/O) interface 905 is also connected to the bus 904.

Components in the device 900 are connected to the I/O interface 905, including: an input unit 906, such as a keyboard, a mouse; an output unit 907, such as various types of displays, speakers; a storage unit 908, such as a disk, an optical disk; and a communication unit 909, such as network cards, modems, wireless communication transceivers, and the like. The communication unit 909 allows the device 900 to exchange information/data with other devices through a computer network such as the Internet and/or various telecommunication networks. The computing unit 901 may be formed of various general-purpose and/or special-purpose processing components with processing and computing capabilities. Some examples of the computing unit 901 include, but are not limited to, a central processing unit (CPU), graphics processing unit (GPU), various specialized artificial intelligence (AI) computing chips, various computing units that run machine learning model algorithms, digital signal processor (DSP), and any suitable processor, controller, microcontroller, etc. The computing unit 901 performs various methods and processes described above, such as an image processing method. For example, in some embodiments, the image processing method may be implemented as computer software programs that are tangibly embodied on a machine-readable medium, such as the storage unit 908. In some embodiments, part or all of the computer program may be loaded and/or installed on the device 900 via the ROM 902 and/or the communication unit 909. When a computer program is loaded into the RAM 903 and executed by the computing unit 901, one or more steps of the image processing method described above may be performed. In some embodiments, the computing unit 901 may be configured to perform the image processing method in any other suitable manner (e.g., by means of firmware).

Various implementations of the systems and techniques described herein above may be implemented in digital electronic circuitry, integrated circuit systems, field programmable gate arrays (FPGA), application specific integrated circuits (ASIC), application specific standard products (ASSP), system-on-chip (SOC), complex programmable logic device (CPLD), computer hardware, firmware, software, and/or combinations thereof. These various embodiments may include being implemented in one or more computer programs executable and/or interpretable on a programmable system including at least one programmable processor, and the programmable processor may be a special-purpose or general-purpose programmable processor, and may receive data and instructions from a storage system, at least one input device and at least one output device, and may transmit data and instructions to the storage system, the at least one input device, and the at least one output device.

Program code for implementing the methods of the present invention may be written in any combination of one or more programming languages. These program codes may be provided to a processor or controller of a general computer, a dedicated computer, or other programmable data processing device, such that the program codes, when executed by the processor or controller, cause the functions and/or operations specified in the flow diagrams and/or block diagrams is performed. The program code can be executed entirely on the machine, partly on the machine, as a stand-alone software package partly on a machine and partly on a remote machine or entirely on a remote machine or server.

In the context of the present invention, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

To provide interaction with a user, the systems and techniques described herein may be implemented on a computer having a display device (e.g., a cathode ray tube (CRT) or liquid crystal display (LCD)) for displaying information for the user; and a keyboard and pointing device (e.g., a mouse or trackball) through which a user can provide an input to the computer. Other types of devices can also be used to provide interaction with the user, for example, the feedback provided to the user may be any form of sensory feedback (e.g., visual feedback, auditory feedback, or tactile feedback); and may be in any form (including acoustic input, voice input, or tactile input) to receive the input from the user.

The systems and techniques described herein may be implemented on a computing system that includes back-end components (e.g., as a data server), or a computing system that includes middleware components (e.g., an application server), or a computing system that includes front-end components (e.g., a user computer with a graphical user interface or web browser through which a user can interact with implementations of the systems and techniques described herein), or a computer system including such a backend components, middleware components, front-end components or any combination thereof. The components of the system may be interconnected by any form or medium of digital data communication (e.g., a communication network). Examples of the communication network includes: Local Area Networks (LAN), Wide Area Networks (WAN), the Internet and blockchain networks.

The computer system may include a client and a server. The Client and server are generally remote from each other and usually interact through a communication network. The relationship of the client and the server is generated by computer programs running on the respective computers and having a client-server relationship with each other. The server may be a cloud server, also known as a cloud computing server or a cloud host, which is a host product in the cloud computing service system, and solves the defects of difficult management and weak business expansion in traditional physical hosts and virtual private servers ("VPS" for short). The server may also be a server of a distributed system, or a server combined with a blockchain.

It should be understood that the steps may be reordered, added or deleted by using the various forms of flows shown above. For example, the steps described in the present invention may be executed in parallel, sequentially, or in different orders, as long as the desired results of the technical solutions in the present invention can be achieved, and no limitation is imposed herein.

The above-mentioned specific embodiments do not limit the scope of protection of the present invention. It should be understood by those skilled in the art that various modifications, combinations, sub-combinations and replacements may be made depending on design requirements and other factors. Any modifications, equivalent replacements, and improvements made within the principles of the present invention should be included within the protection scope of the present invention.

The invention claimed is:

1. A method of deriving a Decoder-side Intra Mode Derivation (DIMD) predictor for respective samples of a coding unit (CU) of a picture, the method comprising:

splitting a template area adjacent to the CU into a plurality of template area regions;

separately selecting zero, one or more Intra Prediction Modes (IPMs) in each template area region, wherein the selection involves a selection out of the separately determined IPMs for one or more regions of the CU;

determining blending weights using the selected IPMs, and generating the DIMD predictor by blending at least the selected IPMs using the determined blending weights;

wherein the blending weights are determined by weighting template area region-specific values derived from predefined characteristics of the selected IPMs according to a number of selected IPMs;

wherein, when two or more selected IPMs are identical in different template area regions, the IPM for the first or last processed template area region is selected and kept, and the other identical IPMs are discarded.

2. The method of claim 1, wherein a number of selected IPMs per template area region depends on a size of the CU, and wherein in case the CU is of square shape, the same number of IPMs is selected in all template area regions, or the same number of IPMs is selected in all template area regions adjacent to the sides of the CU, with no IPM being selected in the template area region adjacent only to the corner of the CU, or one or more IPMs are selected in the template area region adjacent only to the corner of the CU, with no IPM being selected in all template area regions adjacent to the sides of the CU, or in case the CU is of rectangular shape, a first number of IPMs is selected in a template area region adjacent to the longer side of the CU, a second number of IPMs is selected in the template area region adjacent to the shorter side, and a third number of IPMs is selected in an above-left template area region, wherein the first number is higher than the second and third numbers, and the second and third numbers being the same or different, or the same number of IPMs is selected in a template area region adjacent to the shorter side of the CU and for a template area region adjacent to the longer side of the CU, and no IPM is selected in an above-left template area region, or the same number of IPMs is selected in a template area region adjacent to the shorter side of the CU and for an above-left template area region, and no IPM is selected in a template area region adjacent to the longer side of the CU, or the same number of IPMs is selected in a template area region adjacent to the longer side of the CU and for the above-left template area region, and no IPM is selected in a template area region adjacent to the shorter side of the CU.

3. The method of claim 1, wherein a number of selected IPMs per template area region depends on a size of the CU, and wherein a first number of IPMs is selected in case the CU has a first size, and a second number of IPMs is selected in case the CU has a second size, the second size being higher or larger than the first size.

4. The method of claim 1, wherein for each template area region a predefined number of IPMs is selected, wherein the predefined number is the same or is different for the respective template area regions.

5. The method of claim 1, wherein a first template area region including one or more IPMs having a maximum cumulated amplitude among IPMs from all template area regions is determined, a first number of IPMs is selected in the first template area region, and a second number of IPMs is selected in a second template area region, wherein the second template area region is different from the first template area region, wherein the first number is higher than the second number.

6. The method of claim 1, wherein a total number of selectable IPMs is fixed.

7. The method of claim 1, wherein in case IPMs are selected in all template area regions, the blending weights are derived from one or more predefined characteristics associated with the one or more selected IPMs and obtained from the entire template area, or in case IPMs are selected in one or more but not all the template area regions, the blending weights are derived from one or more predefined characteristics associated with the one or more selected IPMs and obtained from the template area regions from which one or more IPMs are selected, or in case IPMs are selected in only one template area region, the blending weights are derived from one or more predefined characteristics associated with the one or more selected IPMs and obtained from the one template area region.

8. The method of claim 1, wherein the plurality of template area regions of the template area comprise a left template area region, an above template area region and an above-left template area region, or in case the CU is split into a plurality of CU regions, respective template area regions associated with a CU region adjacent to the template area, and, optionally, an above-left template area region.

9. A non-transitory computer-readable storage medium comprising instructions that, when executed by a computer, cause the computer to carry out a method of deriving a Decoder-side Intra Mode Derivation (DIMD) predictor for respective samples of a coding unit (CU) of a picture, the method comprising:

splitting a template area adjacent to the CU into a plurality of template area regions;

separately selecting zero, one or more Intra Prediction Modes (IPMs) in each template area region, wherein the selection involves a selection out of the separately determined IPMs for one or more regions of the CU;

determining blending weights using the selected IPMs, and generating the DIMD predictor by blending at least the selected IPMs using the determined blending weights; wherein the blending weights are determined by weighting template area region-specific values derived from predefined characteristics of the selected IPMs according to a number of selected IPMs;

wherein, when two or more selected IPMs are identical in different template area regions, the IPM for the first or last processed template area region is selected and kept, and the other identical IPMs are discarded.

10. The method of claim 1, wherein in addition to the blending weights of the IPMs, a blending weight of a Planar or DC mode is determined only based on the number of selected IPMs.

11. The method of claim 8, wherein the respective template area regions comprise an above-left template area region.

12. An apparatus of deriving a Decoder-side Intra Mode Derivation (DIMD) predictor for respective samples of a coding unit (CU) of a picture, the apparatus comprising:

a processor; and a memory storing instructions executable by the processor;

wherein the processor is configured to:

split a template area adjacent to the CU into a plurality of template area regions;

separately select zero, one or more Intra Prediction Modes (IPMs) in each template area region, wherein the selection involves a selection out of the separately determined IPMs for one or more regions of the CU;

determine blending weights using the selected IPMs, and generate the DIMD predictor by blending at least the selected IPMs using the determined blending weights; wherein the blending weights are determined by weighting template area region-specific values derived from predefined characteristics of the selected IPMs according to a number of selected IPMs;

wherein when two or more selected IPMs are identical in different template area regions, the IPM for the first or last processed template area region is selected and kept, and the other identical IPMs are discarded.

13. The apparatus of claim 12, wherein a number of selected IPMs per template area region depends on a size of the CU, and wherein in case that the CU is of square shape, the same number of IPMs is selected in all template area regions, or the same number of IPMs is selected in all template area regions adjacent to the sides of the CU, with no IPM being selected in the template area region adjacent only to the corner of the CU, or one or more IPMs are selected in the template area region adjacent only to the corner of the CU, with no IPM being selected in all template area regions adjacent to the sides of the CU, or in case that the CU is of rectangular shape, a first number of IPMs is selected in a template area region adjacent to the longer side of the CU, a second number of IPMs is selected in the template area region adjacent to the shorter side, and a third number of IPMs is selected in an above-left template area region, wherein the first number is higher than the second and third numbers, and the second and third numbers being the same or different, or the same number of IPMs is selected in a template area region adjacent to the shorter side of the CU and for a template area region adjacent to the longer side of the CU, and no IPM is selected in an above-left template area region, or the same number of IPMs is selected in a template area region adjacent to the shorter side of the CU and for an above-left template area region, and no IPM is selected in a template area region adjacent to the longer side of the CU, or the same number of IPMs is selected in a template area region adjacent to the longer side of the CU and for the above-left template area region, and no IPM is selected in a template area region adjacent to the shorter side of the CU.

14. The apparatus of claim 12, wherein a number of selected IPMs per template area region depends on a size of the CU, and wherein a first number of IPMs is selected in case the CU has a first size, and a second number of IPMs is selected in case the CU has a second size, the second size being higher or larger than the first size.

15. The apparatus of claim 12, wherein for each template area region a predefined number of IPMs is selected, wherein the predefined number is the same or is different for the respective template area regions.

16. The apparatus of claim 12, wherein a first template area region including one or more IPMs having a maximum cumulated amplitude among IPMs from all template area regions is determined, a first number of IPMs is selected in the first template area region, and a second number of IPMs is selected in a second template area region, wherein the second template area region is different from the first template area region, wherein the first number is higher than the second number.

17. The apparatus of claim 12, wherein a total number of selectable IPMs is fixed.

18. The method of claim 1, wherein the predefined characteristics are cumulated amplitudes, associated with the selected IPMs, of respective local Histogram of Gradients (HoG) of the template area regions.

* * * * *